United States Patent Office 3,072,626
Patented Jan. 8, 1963

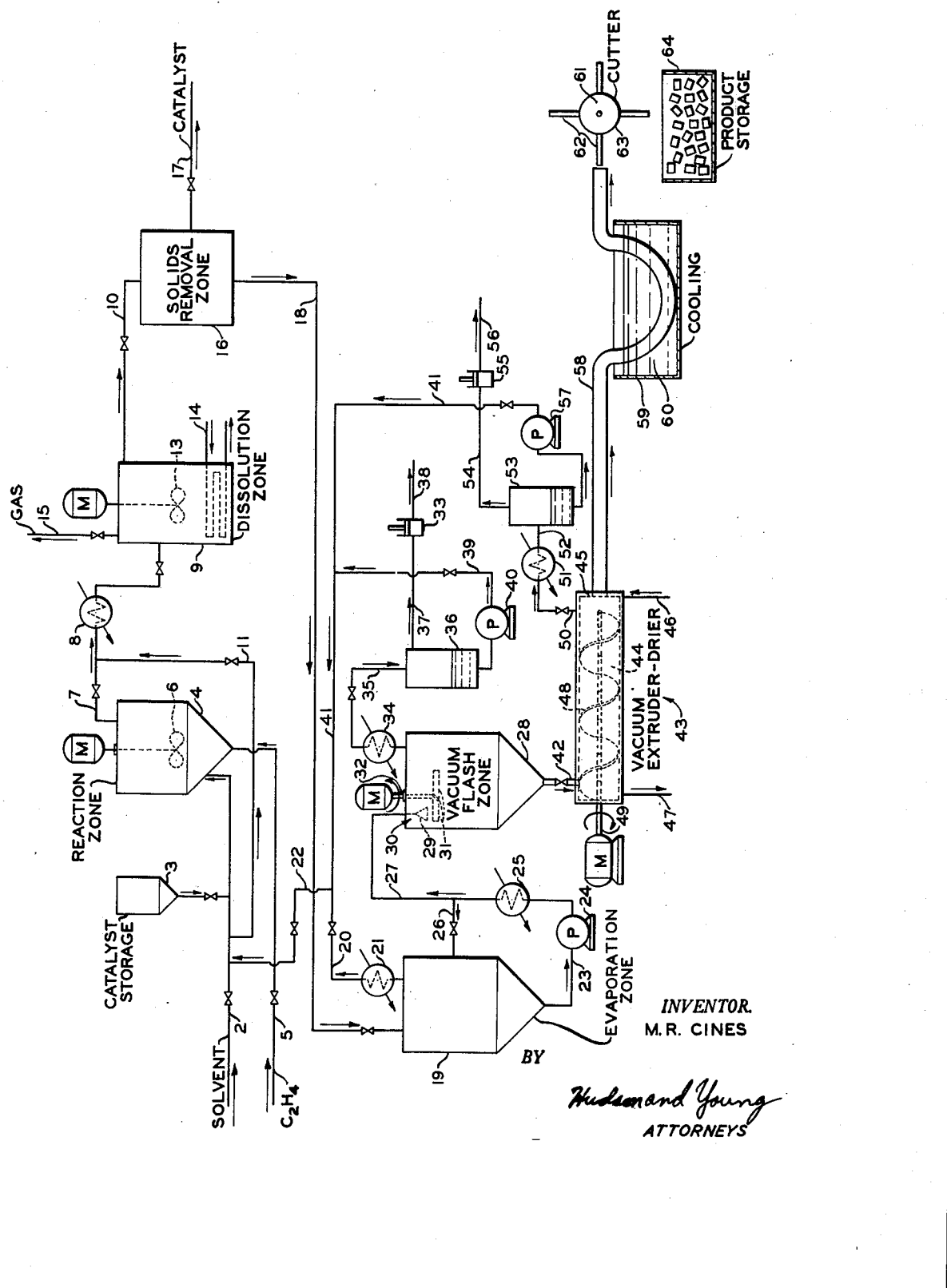

3,072,626
POLYMER RECOVERY PROCESS
Martin R. Cines, Bartlesville, Okla., assignor to Phillips Petroleum Company, a corporation of Delaware
Filed Mar. 24, 1955, Ser. No. 496,515
14 Claims. (Cl. 260—93.5)

This invention relates to the production and recovery of normally solid polymers. In one aspect, it relates to the recovery of a normally solid polymer from a solution thereof in a solvent. In another aspect, it relates to a novel method for the production of a substantially solvent-free polymer.

Several different processes are known in the art for the production of normally solid polymers, such as polyethylene, polybutadiene, and polystyrene. In many of the known processes, the polymer is initially obtained in the form of a solution in the solvent and must be recovered therefrom. Recovery can be effected by different methods, such as solvent vaporization, which leaves the polymer as a non-volatile residue, and cooling of the solution to cause precipitation of the polymer, which is subsequently recovered by filtration. Vaporization processes for solvent removal are accompanied by difficulty in removing the last traces of solvent from the polymer. This difficulty arises from the fact that as the solution becomes more and more concentrated, its viscosity increases. Heat transfer is correspondingly retarded and, if proper control is not exercised, the polymer may be thermally decomposed as a result of unduly high residence times in recovery equipment at high localized temperatures. It is highly desirable to free the polymer from the solvent insofar as possible because small amounts, e.g., a few weight percent, of solvent in the polymer form bubbles and, consequently, cavities when the polymer is heated preparatory to molding.

The present invention provides a process by which polymer can be recovered from a solution thereof by vaporization of the solvent without thermal decomposition of the polymer and the finally recovered polymer contains less than 1 weight percent of solvent, and often less than 0.2 weight percent and can be molded without undue formation of cavities caused by solvent vaporization.

The process of the present invention is effected in these stages. The first stage is a vaporization step in which a solution of normally solid polymer, ordinarily relatively dilute, is subjected to an elevated temperature, above the melting point of the polymer, and a substantial portion of the solvent is thereby vaporized. In the second stage, the concentrated solution obtained as a residue in the first stage is subjected to vaporization conditions below the melting point of the polymer to remove most of the remaining unvaporized solvent and obtain a solid concentrate. In the third stage, the solid concentrate from the second stage is subjected to a mixing action at a temperature above the melting point of the polymer and a substantial portion of the remaining solvent is vaporized. The polymer thus freed of solvent is solidified and recovered as a product.

The melting point of the polymer will vary, depending on the physical and chemical nature and origin of the polymer. Polyethylenes ordinarily range in melting point from about 210 to about 260° F. The polyethylenes prepared by the process of Hogan and Banks (cited subsequently herein) ordinarily have melting points in the range 240 to 260° F. but can have melting points outside this range.

A special feature of this invention resides in conducting the flashing of the concentrated polymer solution, in the second step, at a temperature below the melting point of the polymer, and preferably at a subatmospheric pressure. Thus, an apparently "dry" or solid flash residue is obtained which is much more readily removed from the flashing apparatus than is a molten or liquid residue. It is also within the scope of this invention to form and collect the residue in the "dry" state and melt the collected residue for transfer, as a liquid, to a subsequent step in the process.

The recovery process of this invention is particularly applicable to the recovery of a polymer produced in a process of the type disclosed and claimed in the copending application of Hogan and Banks, Serial No. 476,306, filed December 20, 1954, now abandoned, wherein an aliphatic 1-olefin having a maximum chain length of 8 carbon atoms and no branching nearer the double bond than the 4-position is subjected to polymerization conditions in the presence of a catalyst comprising chromium oxide, of which a substantial portion of the chromium is hexavalent, associated with at least one oxide selected from the group consisting of silica, alumina, zirconia and thoria. The chromium (Cr) content of the catalyst is ordinarily a minor proportion, preferably from 0.1 to 10 weight percent. Polymerization is ordinarily conducted at a temperature in the range 150 to 450° F. The reacted olefin, e.g., ethylene and/or propylene, is often, though not necessarily, subjected to the polymerization conditions in admixture with a hydrocarbon solvent which is inert and can exist as a liquid at the polymerization temperature. Suitable solvents of this class are normally liquid naphthenes, such as cyclopentane, cyclohexane, methylcyclopentane, methylcyclohexane, and paraffinic hydrocarbons having from 3 to 12, preferably 5 to 12, carbon atoms per molecule, e.g. normal hexane, isoheptanes, normal octane and 2,2,4-trimethylpentane. The reaction can be conducted as a fixed-bed reaction but is, in many cases, conducted with the catalyst in comminuted form in suspension, as a slurry, in the hydrocarbon solvent. The effluent withdrawn from the reactor comprises a solution of polymer in the solvent, and when a slurry or suspended catalyst is used, the effluent comprises a solution of the polymer in the solvent, suspended catalyst with undissolved polymer adhering thereto, and, in many cases, small amounts of unreacted olefin. The unreacted olefin can be removed by venting and/or flashing and the remaining mixture is ordinarily heated to a suitable temperature to effect substantially complete solution of the polymer in the solvent. Additional solvent can be added at this point, if desired, and it is ordinarily the practice to adjust the concentration of polymer in the solution to a value in the range of approximately 2 to approximately 10 weight percent. The solution is then filtered to remove the suspended catalyst and a solution containing from 2 to 10 weight percent of polymer in the solvent is thus obtained from which the polymer is recovered. The method of this invention is particularly applicable to the recovery of polymer from such a solution, and particularly to such a solution of a polyethylene. Polymers so recovered are useful for fabrication into pipe, tubing, electrical insulation, and water-resistant wrappings, as more fully set forth in the cited application.

According to one modification of this invention, approximately 25 to 75 percent of the solvent is vaporized in the first stage, from about 85 to 99 percent of the remaining solvent is vaporized in the second stage, and most or substantially all of the remaining solvent is vaporized in the final stage.

When the invention is applied to a solution of polyethylene in, for example, 2,2,4-trimethylpentane or cyclohexane, as previously indicated, it is preferred that the solution fed to the first step of the process have a polyethylene concentration in the range 2 to 10 weight percent. The first step concentrates this solution to a polyethylene concentration in the range 8 to 15 weight percent. The second stage effects a further concentration to from 50 to 99 percent, and the final stage decreases the solvent concentration to less than 1 weight percent in the product polymer.

In one embodiment of the invention, the first step in the recovery process is an evaporation conducted at temperatures in the range 250 to 350° F. and above the melting point of the polymer and the normal boiling point of the solvent, and a pressure in the range 0 to 100 p.s.i.g.; the second step is a vacuum flash conducted at a temperature in the range 100 to 250° F., and below the melting point of the polyethylene, at a pressure which is preferably not greater than 10 p.s.i.a. but which can be as high as about 13 p.s.i.a.; the final step is a vacuum extrusion step conducted at a maximum pressure of about 10 p.s.i.a. and a temperature in the range 375 to 450° F. In the final step, the molten polyethylene is subjected to mixing or kneading and the solvent is vaporized under vacuum. The molten polymer is then extruded in the form of a continuous column or filament and can be cut into pellets or cylindrical or other desired shape and any desired length.

The first two stages of the process of this invention can be conducted in evaporators or vacuum flash tanks, the general construction of which is well known in the art. However, certain special features are involved in the construction of the second flash apparatus. It has been found that it is difficult to comminute a concentrated solution of polyethylene to form droplets by passing same through an ordinary spray apparatus. In many cases, the solution passes through the openings of the spray in the form of strings or filaments. This condition can be remedied by the use of any suitable mechanical means for severing the extruded strings or filaments. One type of apparatus for this purpose is subsequently described herein. The general structure of such an apparatus is disclosed and claimed in the copending application Serial No. 539,523, filed October 10, 1955.

The apparatus used in the final step is ordinarily in the form of a heated elongated chamber having apparatus connected therewith which can reduce the pressure therein to sub-atmospheric. This apparatus is also provided with an agitation or kneading device, such as one or more screw conveyors and is further equipped with one or more outlet conduits in the form of a constricted opening or die through which the molten polymer can be extruded. A suitable device for the final stage solvent removal is manufactured by Welding Engineers, Inc., of Norristown, Pennsylvania, and is described in bulletins currently published by that firm. Such an apparatus is capable of operating at a pressure as low as 6 millimeters of mercury, absolute.

The solvent vaporized in the three steps according to this invention can be condensed, combined, and recovered, for example, for recycling to the polymerization reaction.

The accompanying drawing is a diagrammatic illustration of one embodiment of the invention in connection with a polyethylene production process of the type described in the cited application of Hogan and Banks and in copending application Serial No. 445,042, filed July 22, 1954, now abandoned, by Hogan and Francis.

In the system shown in the drawing, solvent enters through inlet 2 and is mixed with catalyst supplied from storage zone 3. The catalyst can be, for example, chromium oxide supported on a silica-alumina gel and prepared as described subsequently herein. The catalyst particle size is sufficiently small to facilitate the formation of a slurry or catalyst in the solvent. A suitable range of particle size is from 20 to 100 mesh. The catalyst-solvent slurry passes into reaction zone 4. Ethylene enters the system through inlet 5 and passes into the reaction zone 4 wherein it is mixed with the catalyst and the solvent at a temperature, for example, of approximately 275° F. The solvent can be 2,2,4-trimethylpentane. The proportions of solvent and ethylene are so adjusted that the concentration of polymer in the reaction mixture does not exceed approximately 15 percent and preferably is in the range from 5 to 10 weight percent. The pressure in the reaction zone 4 is sufficient to maintain the solvent substantially in the liquid phase and can be, for example, 500 p.s.i. The reaction mixture is maintained in a state of turbulence so that the catalyst is maintained in a substantially uniform suspension or slurry in the reaction mixture. This turbulence can be obtained by jet action of incoming ethylene through inlet 5 and/or by the use of a mechanical stirrer indicated by the numeral 6 and driven by a suitable motor M. The reaction zone effluent which comprises a mixture of polymer, solvent, and suspended catalyst, together with small amounts of unreacted and/or inert gas, is passed through conduit 7 and heater 8 to dissolution zone 9. Additional solvent can be added through conduit 11, if desired, in order to adjust the concentration to a suitably low value, previously stated, so that the viscosity is not too high for efficient agitation. In dissolution zone 9, the mixture is maintained in a state of turbulence, as, for example, by means of a mechanical stirrer 13 driven by a motor M' and the temperature is maintained, for example, by the use of heater 14, at from 300 to 325° F., i.e., somewhat higher than that utilized in reaction zone 4. The pressure is sufficient to maintain the solvent substantially in the liquid phase, but is preferably lower than that in reaction zone 4 to facilitate the evolution of dissolved gas, including unreacted ethylene, which is vented through outlet 15. Heater 14 is of any suitable design known in the art; for example, it can be a steam coil or an electric immersion heater. Effluent from dissolution zone 9 passes through conduit 10 to solids removal zone 16. The material passed through conduit 10 is a homogeneous solution of substantially all of the polymer in the isooctane solvent, which solution contains suspended solid catalyst. Solids removal zone 16 comprises any suitable equipment or combination thereof known in the art for the removal of suspended solids from liquids. For example, it can be a filter or a centrifuge. It should be suitable for operation under pressure in order to maintain the solvent in the liquid phase during the filtration. Catalyst removed by the filtration is withdrawn from the system through conduit 17. The withdrawn catalyst can be regenerated or reactivated, if desired, and recycled to catalyst storage zone 3 by means not shown in the drawing. The solution which has been freed of suspended solids is passed through conduit 18 to evaporation zone 19 which is ordinarily in the form of a flash evaporation tank and is operated, for example, at a temperature of 290° F. and a pressure of 33 p.s.i.g. Approximately half of the solvent is evaporated in zone 19, and the evaporated solvent is passed through conduit 20 and condenser 21. The condensed solvent is then returned through conduits 22 and 2. The residue from evaporation zone 19 is passed through conduit 23, pump 24 and heat exchanger 25 wherein the temperature is raised, for example, to 310° F. Part of the solution is returned through conduit 26 to evaporation zone 19. This mode of operation allows outside heating of the unvaporized material from evaporation zone 19 and is a preferred method of supplying heat to said zone, since it is ordinarily impractical to supply heat efficiently directly to the interior of zone 19 on account of the physical characteristics of the polymer-solvent solution.

The remainder of the unvaporized material is passed through conduit 27 to vacuum flash zone 28, which is operated, for example, at a temperature of 135° F. and 3 p.s.i.a. The solution entering vacuum flash zone 28 has a concentration, for example, of 10 weight percent polyethylene in the isooctane solution. The partially concentrated polymer solution enters flash zone 28 through spray means 29 which is of conventional construction. Since a polymer of the type here involved is not readily atomized in the form of liquid droplets, the polymer solution emerges from spray means 29 in the form of continuous cylinders or filaments. In order to facilitate movement of the polymer through the system and in order to promote vaporization of the solvent, there is provided a cutting means designated by the numeral 30 which comprises a plurality of knife blades 31 mounted on a rotatable shaft 32 which is driven by a suitable motor, not shown in the drawing. A vacuum is maintained on flash zone 28 by means of a vaccum pump 33 which is connected to zone 28 through condenser 34, conduit 35, accumulator 36, and conduit 37. Solvent which is vaporized in vacuum flash zone 30 is condensed in condenser 34 and passed through conduit 35 to accumulator 36. Gaseous material is withdrawn from the system through exhaust conduit 38. Condensed solvent is passed through conduit 39 by means of pump 40 and then passes through conduits 41 and 22 for return to conduit 2.

Unvaporized material from vacuum flash zone 28 passes through conduit 42 to vacuum extruder-dryer 43. The vacuum extruder-dryer comprises an inner chamber 44 enclosed within a heating jacket 45 through which hot oil is circulated, being supplied through inlet 46 and withdrawn through inlet 47 to heating and recirculation means, not shown. Within chamber 44 is positioned one or more helical conveyors or extruders 48 mounted on a shaft 49 which is connected with a suitable driving motor, as shown in the drawing. Also connected with the inner chamber 44 of the vacuum extruder-dryer through conduit 50, condenser 51, conduit 52, accumulator 53, and conduit 54, is vacuum pump 55 which exhausts through conduit 56.

Concentrated polymer at a temperature below its melting point, and containing approximately 20 weight percent of isooctane solvent, is withdrawn from vacuum flash zone 28 through conduit 42 and passed to vacuum extruder-dryer 43 and is therein kneaded at a temperature above its melting point, under a vacuum produced by vacuum pump 55, so that substantially the last trace of solvent is removed therefrom. Solvent vaporized in vacuum extruder-dryer 43 is passed through conduit 50, condensed in condenser 51 and passed into accumulator 53. Liquefied solvent is then withdrawn and returned through conduit 41 and pump 57 through conduit 22 to inlet 2.

Molten polymer is extruded as one or more strands or filaments from vacuum extruder-dryer 43 along or through conduit or route 58 and is passed through cooling means 59, which can be an open tank containing a coolant 60, such as water. As will be evident to those skilled in the art, conduit or route 58 can be, but need not be, a closed conduit; it can be merely an open route or path or an open conveyor, a trough, or a chute. The solidified polymer, at the end of conduit or route 58, is cut into the form of short cylinders by means of cutter 61 which can comprise, for example, a plurality of cutting blades 62 mounted on a suitable rotor or cylinder 63 which is rotated by a suitable motor, not shown in the drawing. Pelleted polymer is collected in product storage means 64.

Although not shown in the drawing, the first or evaporation step (zone 19) can be effected in two stages, the first being effected in an apparatus of the type described in connection with zone 19 and the second being a similar apparatus operated at a slightly lower temperature and pressure within the ranges disclosed in connection with the discussion of zone 19. Thus, in the first stage of step 1, a 2 to 4 weight percent polymer solution can be flashed at from 300 to 350° F. and 50 to 100 p.s.i.g. to obtain a concentrate containing from 5 to 7 weight percent polymer, which is flashed in the second stage of step 1 at from 250 to 300° F. and from 0 to 50 p.s.i.g. to obtain a concentrate containing from 9 to 12 weight percent polymer as feed to step 2, the vacuum flash step.

*Example*

In a run for the production of polyethylene, a saturated solution of ethylene in 2,2,4-trimethylpentane (isooctane) is maintained in a pressure reactor equipped with a stirrer. The isooctane containing 20 to 100 mesh catalyst in suspension is supplied continuously to the reactor. Ethylene, from which oxygen has been removed by contact with reduced copper oxide, is supplied to the reactor as a separate stream. The catalyst is prepared by impregnating a steam-aged, coprecipitated gel composite comprising 90 weight percent silica and 10 weight percent alumina with an aqueous solution of chromium trioxide, drying the resulting solid composite, and heating the dried composite at approximately 950° F. for about 5 hours in a stream of substantially anhydrous air. The catalyst contains a total of 2 weight percent chromium, at least half of which is in the hexavalent state.

The reactor is maintained at a temperature of approximately 300° F. and a pressure of approximately 600 p.s.i.g. Total effluent is continuously withdrawn from the reactor, heated to 315° F., and passed to a dissolution tank maintained at 315° F. and 100 p.s.i. from which unreacted ethylene and any other normally gaseous material is vented. Additional isooctane is added to the total reactor effluent prior to the heating and flashing. The proportion of ethylene to total isooctane added upstream and downstream from the reactor is so adjusted that a solution containing approximately 5 weight percent of polyethylene in isooctane is obtained. After heating the effluent to approximaely 315° F. and agitating to effect complete solution of the polymer in the solvent, as described, the catalyst is removed by filtration at approximately 315° F. and 100 p.s.i. The resulting 5 percent solution of polyethylene in isooctane is passed to a solvent evaporator maintained at 290° F. and 33 p.s.i.g. wherein approximately half of the solvent is vaporized. The unvaporized material is withdrawn from the body of the evaporator and passed through a heater wherein it is heated to approximately 310° F. Approximately half of the heated material is returned to the evaporator to supply heat thereto. The remainder is passed to a vacuum flash tank maintained at 135° F. and 3 p.s.i.a. The entering solution, which contains approximately 10 weight percent polyethylene, is passed through a spray nozzle adjacent to which is a revolving knife blade which comminutes the filament-like material which emerges from the spray nozzle. A concentrate containing approximately 80 percent polyethylene and which is solid is removed from the bottom of the vacuum flash tank and is passed to a vacuum extruder-dryer Model 2052B (Model 2052B Extra Long is also quite satisfactory), manufactured by Welding Engineers, Inc., and containing a double helical agitator. In the vacuum extruder-dryer, the temperature is maintained between 370 and 450° F. by circulating hot oil through the heating jacket. The pressure within the middle chamber of the extruder-dryer is maintained at approximately 30 to 50 mm. Hg. Molten polymer containing from 0.019 to 0.026 weight percent of solvent is extruded from the vacuum extruder-dryer and passed through an open tank containing water which cools and solidifies the polymer. The solidified polymer emerges from the cooling tank and is cut by means of a rotary cutter into cylindrical pellets which are recovered as the product of the process.

Although the process of this invention has been described in connection with a particular polyethylene process, it is clearly not limited thereto but is also applicable to the recovery of any normally solid thermoplastic polymer from a solution thereof in a solvent. Thus, the process is also applicable to solutions of polybutadienes, especially hydrogenated polybutadienes as described in copending application Serial No. 395,291, filed November 30, 1953, now Patent No. 2,864,809, by Jones and Moberly, polystyrenes, polypropylenes, polyisobutylenes, and polyethylenes produced by processes other than that of the type described herein, as well as to the recovery of halogenated polyethylenes. Also, the process is not limited to the recovery of polymers from saturated hydrocarbon solvents but is applicable where solvents such as chloroform, carbon tetrachloride, carbon disulfide, and aromatic hydrocarbons and derivatives thereof are used as solvents. The essence of this invention is that a normally solid thermoplastic polymer can be recovered, substantially free from solvent, by a three-step process which comprises evaporating a substantial portion of the solvent in a first step, at a temperature above the melting point of the polymer; vaporizing most of the remaining unvaporized solvent at a temperature below the melting point of the polymer in a second step; and agitating the polymer at a temperature above its melting point to vaporize a substantial proportion of the remaining solvent in a third step, and recovering a substantially solvent-free polymer. Variation and modification are possible within the scope of the disclosure and the claims. Thus the solid concentrate can be transferred from the vacuum flash zone to the vacuum extruder-drier in the molten state, by the use of a conventional solids conveyor, or manually.

I claim:

1. A process for recovering a normally solid thermoplastic polymer from a solution thereof in a solvent, which process comprises vaporizing a substantial portion of the solvent from said solution at a temperature above the melting point of said polymer, subjecting the resulting polymer solution to vacuum flashing in the absence of other material at a maximum pressure of 13 p.s.i.a. at a temperature below the melting point of the polymer and collecting as a product of said vaporization a solid residue consisting of said polymer and a minor amount of solvent, subjecting said solid residue to mixing at a temperature above its melting point while vaporizing most of the remaining solvent therefrom, solidifying the polymer so obtained, and recovering solid, substantially purified polymer.

2. A process for recovering a normally solid thermoplastic polymer of an olefinic hydrocarbon from a dilute solution thereof in a hydrocarbon solvent, which process comprises vaporizing from 25 to 75 percent of said solvent from said solution at a temperature above the melting point of said polymer, subjecting the resulting polymer solution to vacuum flashing in the absence of other material at a maximum pressure of 13 p.s.i.a. at a temperature below the melting point of the polymer to remove 85 to 99 percent of the remaining unvaporized solvent and collecting as a product of said vaporization a solid residue consisting of said polymer and a minor amount of solvent, subjecting said solid residue to kneading at a temperature above its melting point while vaporizing a substantial proportion of the remaining solvent therefrom, solidifying the polymer so obtained and recovering solid, substantially solvent-free polymer as a product.

3. A process according to claim 2 wherein said polymer is a hydrogenated polybutadiene.

4. A process according to claim 2 wherein said polymer is a polystyrene.

5. A process according to claim 2 wherein said polymer is a normally solid polymer obtained by polymerizing at least one 1-olefin having a maximum chain length of 8 carbon atoms and no branching nearer the double bond than the 4-position in the presence of a catalyst comprising, as an essential ingredient, chromium oxide.

6. A process for recovering a normally solid polyethylene, produced by polymerization in the presence of a catalyst comprising chromium oxide as an essential constituent thereof, from solution in a hydrocarbon solvent selected from the group consisting of paraffins and naphthenes which are liquefiable at a temperature in the range 150 to 450° F., which process comprises subjecting such a solution containing from 2 to 10 weight percent of polyethylene to vaporization conditions whereby an appreciable portion of said solvent is vaporized and an unvaporized concentrate having a polyethylene concentration from 8 to 15 weight percent is obtained as a residue, said vaporization being conducted at a temperature above the melting point of said polyethylene; subjecting said residue to vacuum flashing in the absence of other material at a maximum pressure of 13 p.s.i.a. at a temperature below the melting point of the polymer and collecting as a product of said vaporization a solid residue consisting of polyethylene and solvent, said polyethylene being in a concentration in the range of 50 to 99 weight percent; kneading said last-mentioned residue at a temperature above the melting point of said polyethylene and a subatmospheric pressure to vaporize most of the remaining solvent and obtaining a polymer containing less than 1 weight percent of solvent; extruding said polymer; solidifying the extruded polymer; and recovering the solidified polymer as a product.

7. A process according to claim 6 wherein the vaporization is effected at a temperature in the range 250 to 350° F. and a pressure in the range 0 to 100 p.s.i.g., the vacuum flashing is effected at a maximum pressure of 10 p.s.i.a. and a temperature in the range 100 to 250° F., the kneading is effected at a temperature in the range 375 to 450° F. and a maximum pressure of 10 p.s.i.a., and the solidified polyethylene is formed into pellets.

8. A process according to claim 6 wherein the solvent vaporized in the vaporization, in the vacuum flash, and in the kneading step, is condensed, combined, and recovered.

9. A process for recovering a normally solid polyethylene, produced by polymerization in the presence of a catalyst comprising, as an essential ingredient, chromium oxide, from solution in a hydrocarbon solvent selected from the group consisting of paraffins and naphthenes having from 3 to 12 carbon atoms per molecule, which process comprises subjecting such a solution containing from 2 to 10 weight percent of said polyethylene to vaporization conditions whereby an appreciable portion of said solvent is vaporized and an unvaporized concentrate having a polyethylene concentration of from 8 to 15 weight percent is obtained as a residue, said vaporization being conducted at a temperature above the melting point of said polyethylene; comminuting said residue and subjecting same to vacuum flashing in the absence of other material at a maximum pressure of 13 p.s.i.a. at a temperature below the melting point of the polymer and obtaining solid residue consisting of polyethylene and solvent, said polyethylene being present in a concentration in the range of 50 to 99 weight percent; kneading said last-mentioned residue at a temperature above the melting point of said polyethylene and a subatmospheric pressure to vaporize most of the remaining solvent and obtain a polyethylene containing less than 1 weight percent of solvent; extruding said polymer; solidifying the extruded polyethylene; and recovering the solidified polyethylene as a product.

10. In a process wherein a normally solid thermoplastic polymer is recovered from solution in a solvent by vaporization of said solvent and producing a residue containing said polymer, the improvement which comprises subjecting said polymer solution to vacuum flashing in the absence of other material at a maximum pressure of 13 p.s.i.a. at a temperature below the melting point of the polymer, and collecting, as a product of said vaporization, a solid residue consisting of said polymer and a minor amount of solvent.

11. A process according to claim 10 wherein said polymer is a polyethylene produced in the presence of a chromium oxide catalyst, said solvent is a hydrocarbon selected from the group consisting of paraffins and naphthenes which are liquefiable at a temperature from 150 to 450° F., the polymer concentration in said solution is from 8 to 15 weight percent, and said vaporization is effected at a temperature in the range 100 to 250° F. and a pressure not greater than 10 p.s.i.a.

12. A process according to claim 10 wherein said polymer is a polymer of propylene.

13. A process according to claim 10 wherein said polymer is a polymer of isobutylene.

14. A process according to claim 10 wherein said polymer is a polyethylene.

References Cited in the file of this patent
UNITED STATES PATENTS

| | | |
|---|---|---|
| 2,273,822 | Allen | Feb. 24, 1942 |
| 2,332,276 | Stahly | Oct. 19, 1943 |
| 2,350,400 | King | June 6, 1944 |
| 2,496,653 | Allen et al. | Feb. 7, 1950 |
| 2,561,256 | Wilson et al. | July 17, 1951 |
| 2,691,647 | Field et al. | Oct. 12, 1954 |
| 2,766,224 | Bannon | Oct. 9, 1956 |
| 2,825,721 | Hogan et al. | Mar. 4, 1958 |